(12) United States Patent
Pujol et al.

(10) Patent No.: US 6,277,348 B1
(45) Date of Patent: Aug. 21, 2001

(54) PREPARATION OF MESOPHASIC POLYBORAZYLENE MESOPHASIC POLYBORAZYLENE AND USE AS A BN PRECURSOR

(75) Inventors: Patrick Pujol, Chaniers; Marc Birot, Talence; Jean-Paul Pillot, Cestas; Xavier Bourrat, Bordeaux; Olivier Manfe, Saint Pardoux du Breuil; René Pailler, Cestas; Roger Naslain, Pessac; Jacques Dunogues, Talence, all of (FR)

(73) Assignee: Societe Nationale d'Etude et de Construction de Moteurs d'Aviation-S.N.E.C.M.A., Paris (FR)

( * ) Notice: Subject to any disclaimer, the term of this patent is extended or adjusted under 35 U.S.C. 154(b) by 0 days.

(21) Appl. No.: 09/446,743
(22) PCT Filed: Jul. 1, 1998
(86) PCT No.: PCT/FR98/01403
§ 371 Date: Dec. 27, 1999
§ 102(e) Date: Dec. 27, 1999
(87) PCT Pub. No.: WO99/01378
PCT Pub. Date: Jan. 14, 1999

(30) Foreign Application Priority Data

Jul. 2, 1997 (FR) .................................................. 97 08336

(51) Int. Cl.$^7$ ................................................. C01B 21/064
(52) U.S. Cl. ............................................................ 423/290
(58) Field of Search ............................................. 423/290

(56) References Cited

U.S. PATENT DOCUMENTS 5,502,142 * 3/1996 Sneddon et al. .......................... 528/7

OTHER PUBLICATIONS

**Kim, D. et al., "Occurrence of Liquid Crystallinity in a Borazine Polymer", Chemistry of Materials, vol. 6, 1994, pp. 395–400.
**Cofer, C.G. et al., "Formation of an Ordered Boron Nitride Matrix for Fiber Reinforced Composites", vol. 46, 1994, pp. 189–197.
CA:112:144302 abs of Chem Mater. by Fazen et al 2(2) pp 96–97, 1990.*
CA:120:258084 abs of Chem Mater. by Kim et al 6(4) pp 395–400, 1994.*
CA:123:206665 abs of Chem Mater. by Fazen et al 7(10) pp 1942–1956, 1995.*
CA:124:209643 abs of J Mater. Res. By Chan et al 11(2) pp 373–380, 1996.*

* cited by examiner

Primary Examiner—Jean F. Vollano
(74) Attorney, Agent, or Firm—Weingarten, Schurgin, Gagnebin & Hayes LLP

(57) ABSTRACT

The present invention relates to:
  a novel process for the preparation of mesophasic polyborazylene. Said process is of particular value in that it affords a quality product from an appropriate polyborazylene, rapidly (virtually instantaneously), reproducibly and with a good yield. Furthermore, said process is easy to carry out. Said process comprises the preparation of polyborazylene by the polycondensation of borazine in a closed reactor and the addition, to said polyborazylene obtained by polycondensation, of a solvent selected from aromatic solvents, borazine solvents and mixtures thereof,
  mesophasic polyborazylene which is novel in that it is in the presence of a particular solvent and/or by virtue of its quality,
  the use of said polyborazylene of the invention, and/or prepared according to the invention, as a boron nitride precursor.

20 Claims, 6 Drawing Sheets

PREPARATION OF MESOPHASIC POLYBORAZYLENE MESOPHASIC POLYBORAZYLENE AND USE AS A BN PRECURSOR

This application is the national phase of PCT/FR98/01403, filed Jul. 1, 1998, now WO99/01389.

The present invention relates to:
a novel process for the preparation of mesophasic polyborazylene. Said process is of particular value in that it affords a quality product from an appropriate polyborazylene, rapidly (virtually instantaneously), reproducibly and with a good yield. Furthermore, said process is easy to carry out, mesophasic polyborazylene which is novel in that it is in the presence of a particular solvent and/or by virtue of its quality, the use of said polyborazylene of the invention, and/or prepared according to the invention, as a boron nitride precursor.

Since the midseventies, the appearance of new technological stakes in materials sciences has rekindled interest in organometallic polymers, and numerous developments have appeared. Thus there have been reports on the synthesis of siliconcontaining polymers, of the SiC and $SiC/Si_3N_4$ type, capable of being shaped and of being used as precursors to ceramics. These discoveries, combined with increasing practical needs for molding compounds and for new materials for hightemperature applications, have encouraged new research into organometallic and inorganic polymers.

Boron nitride is the basis of commercial ceramics. It can easily be obtained in powder form by the pyrolysis of relatively inexpensive reactants. Unfortunately, it is very difficult to obtain said boron nitride in the form of fibers or films from powders. The use of polymers based on boron and nitrogen seemed to be a very attractive way of doing this. Thus polymers of this type, obtained by the polycondensation of borazine, have already been used. Borazine or "inorganic benzene", which is easy to prepare, is in fact an appropriate precursor (being a reactive planar molecule capable of generating planar polycondensed molecules consisting of borazine rings). Said borazine has the following chemical formula:

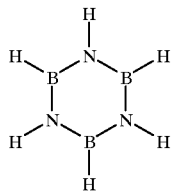

and is characterized by a B/N atomic ratio of 1.

In a first method, said borazine was polymerized in bulk, with regular degassing (the dihydrogen is evacuated as it is formed), to generate a polymer, polyborazylene, which can be deposited especially in the form of a film. Said polyborazylene, its preparation by this method and its uses as a boron nitride precursor have been described in particular by:

FAZEN P. J., BECK J. S., LYNCH A. T., REMSEN E. E., SNEDDON L. G., in "Thermally Induced Borazine Dehydropolymerization Reactions, Synthesis and Ceramic Conversion Reactions of a New Highyield Polymeric Precursor to Boron Nitride", Chem. Mater., 1990, 2, 96–97;

FAZEN P. J., REMSEN E. E., BECK J. S., CARROLL P. J., McGHIE A. R., SNEDDON L. G., in "Synthesis, Properties and Ceramic Conversion Reactions of Polyborazylene. A Highyield Polymeric Precursor to Boron Nitride", Chem. Mater., 1995, 7, 1942–1956.

The specific use of said polyborazylene in the form of a film has been described in particular by:

CHAN V. Z-H., ROTHMAN J. B., PALLADINO P., SNEDDON L. G., COMPOSTO R. J., in "Characterization of Boron Nitride Thin Films Prepared from a Polymer Precursor", J. Mater. Res., 1996, 11(2), 373–380;

SNEDDON L. G., BECK J. S., FAZEN P. J., in "Direct Thermal Synthesis in the Absence of Catalyst, and Ceramic Applications of Poly(borazylenes)", patent U.S. Pat. No. 5,502,142.

In a second method, said borazine was polymerized in bulk with the pressure being allowed to increase in the reactor. Economy et al. showed that, under such conditions, it was possible to obtain oligomers with a very low "graphitization" temperature (1500° C. instead of 2500° C. for an ordinary boron nitride) (graphitization being a process of three-dimensional organization of the sheets of BN hexagons, analogous to the organization of the graphite crystal).

To obtain, under these conditions, a polymer capable of developing a mesophase, Economy et al. either stored the resulting oligomer for several weeks at a temperature of between 0 and 5° C., or baked said oligomer at 100° C. under a pressure of 20 MPa. (Observations by polarized light microscopy show that the application of a heat treatment up to 100° C. has the effect of disordering the material. However, after return to room temperature, Economy et al. observe a return to an anisotropic state, although this reversibility is not total. In fact, X-ray diffraction shows a peak corresponding to the (002) planes, broadened after treatment at 100° C.)

Both of the above methods, which therefore afforded mesophasic polyborazylene, have been described respectively by:

KIM D., ECONOMY J., in "Occurrence of Liquid Crystallinity in a Borazine Polymer", Chem. Mater., 1994, 6, 395–400 (storage at low temperature);

and by:

COFER C.G., KIM D., ECONOMY J., in "Formation of an Ordered Boron Nitride Matrix for Fiber Reinforced Composites", Ceram. Trans., 1994, 46, 189–197 (baking under pressure).

However, said methods are difficult to reproduce and relatively expensive to carry out and, in any case, generate polyborazine mesophases of mediocre quality with only a very low yield.

Now, those skilled in the art are not unaware of how valuable it would be to have easy and quantitative access to a sufficiently fluid mesophasic polymer which already contained broad anisotropic domains, foreshadowing the sheet structure of the desired ceramic, for use as a precursor to boron nitride, especially hexagonal boron nitride (BN-hex), with a view to applications as a matrix and interphase, or even fibers, etc.

Faced with this technical problem of providing such a boron nitride precursor—mesophasic polyborazylene—the Applicant has developed a novel process for the preparation of said precursor. Said process makes it possible to obtain said precursor under very advantageous conditions and in novel forms.

According to its first subject, the invention therefore relates to a novel method of preparing a mesophase which is a boron nitride precursor, said method affording the desired product (virtually) instantaneously and quantitatively and with a high yield. Said method consists essentially in adding a solvent to a polyborazylene. It has the advantage of adjusting the viscosity while developing the liquid crystal structure. This facilitates control over the rheology when shaping materials, such as an interfacial film for composite materials.

More precisely, the process proposed according to the invention is a process for the preparation of mesophasic polyborazylene which comprises two essential steps. In the first of said steps, polyborazylene is prepared by the polycondensation of borazine in a closed reactor. This synthesis of polyborazylene, which has been known per se since at least 1959 (D. T. Haworth, L. F. Hohnstedt, J.A.C.S., 1959, vol. 82, 3860), is carried out by the technique of the prior art referred to above. In the second of said steps, as a characteristic feature, the desired mesophase is obtained virtually instantaneously by the addition, to said polyborazylene obtained by polycondensation in a closed reactor, of an appropriate additive (called a solvent) selected from aromatic solvents, borazine solvents and mixtures thereof.

Totally surprisingly, the Applicant has found that a polyborazylene prepared in a closed reactor (i.e. in particular under the pressure of the dihydrogen released) leads instantaneously, under the effect of an appropriate solvent, to the formation of a mesophase, reproducibly and with high yields.

Within the framework of the process of the invention, the simple intervention of a suitable solvent is advantageously substituted for the techniques of the prior art involving slow ageing at low temperature or baking under pressure, which afford a mesophasic polyborazylene of low quality, nonreproducibly and with only a low yield. Such a substitution is advantageous by virtue of its ease of use, its high yield, its reproducibility and the quality of the product obtained.

The solvent used, which dissolves the polyborazylene or is itself dissolved in said polyborazylene, favors the organization of the polycondensed molecules. Its use, in larger or smaller quantity (precise details on this point are given below in the present text), affords the mesophase of greater or lesser fluidity.

Whatever the amount of solvent added, notably for the purpose of adjusting the viscosity of the mesophase obtained or of removing said solvent from said mesophase, it is possible, within the framework of the process of the invention, to make provision for a third step involving treatment of said mesophase in order to remove all or part of said solvent therefrom. Those skilled in the art will know how to apply the appropriate techniques to achieve this end. Evaporation techniques, especially under vacuum, may be mentioned without implying a limitation.

Returning to the first step of the process of the invention—the poly-condensation of borazine in a closed reactor—conventionally, said polycondensation is generally carried out at a temperature of between 50 and 120° C., advantageously at a temperature of between 60 and 80° C. It is obviously carried out under an anhydrous inert atmosphere. In particular, it can be carried out under a nitrogen or argon atmosphere. Conventionally, the initial pressure inside the reactor is atmospheric pressure. Within the framework of the invention, the process has also been carried out under controlled initial inert gas pressures above atmospheric pressure, especially of between $10.10^5$ and $200.10^5$ Pa. Thus the first step of the claimed process, namely the polycondensation, is generally carried out under an initial inert gas pressure of between atmospheric pressure and $200.10^5$ Pa. It is not excluded from the framework of the invention to carry out said first step under a total or partial pressure of dihydrogen (said dihydrogen constituting a chemically inert gas in the present case).

For information, and without in any way implying a limitation, the Applicant is in a position to indicate here that the polyborazylene obtained at the end of the first polycondensation step carried out in a closed reactor generally has the following characteristics:

$\overline{M}_n \approx 600{-}1400$ (number-average molecular weight)

$\overline{M}_w \approx 1600{-}5700$ (weight-average molecular weight)

$I_p \approx 2{-}6$ (polymolecularity index)

which are determined by size exclusion chromatography (SEC) with a polystyrene standard. (It may be pointed out more precisely that the molecular weight analyses were performed using a Waters 510 apparatus equipped with a Waters 410 differential refractometric detector. The calculation of the different molecular weights is based on a calibration obtained from monodisperse polystyrene standards under the following conditions: column: TSK GMHXL, porosity: 1500 to $10^7$ Å; eluent: THF, flow rate: 1 ml/min, duration: 15 min.)

As a characteristic feature within the framework of the process of the invention, said polyborazylene obtained at the end of the first polycondensation step in a closed reactor is brought into contact with an appropriate additive called a solvent. Said solvent is generally added to said polyborazylene, cooled to room temperature.

Said solvent is selected from:

aromatic solvents such as benzene, toluene, ortho-, meta- and paraxylenes, etc.

borazine solvents such as borazine and derivatives thereof Said derivatives include especially Nalkyl and/or Balkylborazines (such as N-trimethylborazine and N-triisopropylborazine), the term alkyl generally corresponding to linear or branched ($C_1$-$C_8$)-alkyl groups insofar as the derivatives are liquid under the conditions applied. Said derivatives are not substituted by reactive functional groups, mixtures of said solvents.

In one advantageous variant, the solvent used is selected from borazine, benzene, toluene and xylenes.

Irrespective of its nature, said solvent is quite obviously used dry and with an appropriate degree of purity.

Likewise, it is quite obviously used in a reasonable and appropriate amount. Said solvent is generally added in a solvent/polyborazylene weight ratio below 10 (generally greater than or equal to 0.1) and advantageously of between 0.2 and 5. In fact, said solvent is suitably added:

in a minimal amount in order to achieve the expected effect, namely orientation of the mesogenic molecules and adjustment of the viscosity or fluidity of the mixture;

in a reasonable amount in order to avoid destroying the mesophase when the solution obtained is too dilute.

It has already been indicated that said solvent can be added in a certain amount during the second step of the process of the invention and totally or only partially removed during a third step.

It is advisable to adjust the amount of solvent added to the intended final use of the mesophase prepared.

The Applicant thus recommends:

adding said solvent in a solvent/polyborazylene weight ratio greater than 1, especially for the preparation of a mesophasic polyborazylene which is a precursor to interphases (fiber/matrix interphases in the structure of a composite material) based on boron nitride;

adding said solvent in a solvent/polyborazylene weight ratio equal to or less than 1, especially for the preparation of a mesophasic polyborazylene which is a precursor to fibers, matrices or materials based on boron nitride.

The value of the process of the invention will not have escaped those skilled in the art.

As already specified, said process affords a novel mesophasic polyborazylene, which constitutes the second subject of the present invention.

Admittedly, according to the prior art, Economy et al. prepared mesophasic polyborazylene, but said mesophasic polyborazylene was not in the presence of a solvent of the type used in the process of the invention, nor was it in a very "pure" form.

The second subject of the present invention thus relates to:

mesophasic polyborazylene in the presence of a solvent selected from aromatic and borazine solvents and mixtures thereof. All the details regarding the exact nature of said solvent and the amounts used, provided with reference to the process of the invention described above, can be repeated here. It is recalled that said polyborazylene of the invention is in solution in said solvent or, conversely, that said solvent is in solution in said polyborazylene, mesophasic polyborazylene in the presence or absence of such a solvent, characterized in light microscopy by a high degree of anisotropy. As a characteristic feature, the mesophasic polyborazylene of the invention has a degree of anisotropy greater than 50%, advantageously greater than 80% and capable of reaching about 100% in light microscopy. The Applicant claims said mesophasic polyborazylene per se, which has never been obtained according to the prior art. It has described above a process for the preparation of said product, based on the action of a specific solvent on an appropriate polyborazylene.

The value of such a product was recalled in the introduction to the present text. It constitutes a preferred precursor to boron nitride, especially hexagonal boron nitride. Thus the third subject of the present invention relates to the use of a polyborazylene of the invention having the characteristics listed above (the presence of a particular solvent and/or a high degree of anisotropy in light microscopy), and/or the use of a polyborazylene prepared by the process of the invention (comprising mainly the addition of a particular solvent to a polyborazylene obtained by the polycondensation of borazine in a closed reactor), as a precursor to boron nitride, especially hexagonal boron nitride.

Those skilled in the art are perfectly familiar with the heat treatment(s) to be carried out in order to obtain the appropriate ceramization.

The boron nitride obtained from the mesophasic polyborazylene of the invention is generally a boron nitride of the hexagonal type. It is conceivable that a nonhexagonal boron nitride might be obtainable directly from the mesophasic polyborazylene of the invention, but it is most certainly obtainable by conversion, using methods familiar to those skilled in the art, of the hexagonal boron nitride obtained directly from the mesophasic polyborazylene of the invention.

It is specified here, without in any way implying a limitation, that the mesophasic polyborazylene of the invention (and/or prepared according to the invention) can generally be used for the following purposes in particular:

the production of coatings based on boron nitride;

the production of materials, especially fibers, based on boron nitride; and, more particularly, in the context of the preparation of composite materials:

the production of fibers and/or interphases on the surface of fibers and/or matrices.

The mesophasic polyborazylene of the invention is in fact suitable for the preparation of any type of product based on boron nitride, especially boron nitride of the hexagonal type. It is particularly suitable, by virtue of its film-forming properties, for the production of interphases and/or coatings. These are characterized by an excellent homogeneity.

Those skilled in the art are perfectly familiar with the heat treatments to be carried out in order to obtain the appropriate ceramization.

The invention is now illustrated by the attached Figures and the Examples below.

Comments on said FIGS. can be found in the Examples section below. However, the following statements will be made straightaway with reference to FIGS. 1 to 4 (light microscopy) and FIGS. 5 and 6 (electron microscopy).

The characterizations of the mesophases of the invention by light microscopy are effected on an Olympus microscope equipped with a heating stage (Leitz) under a stream of inert gas (argon). The mesophase is deposited directly on the quartz sample holder, allowing observation in transmitted, polarized and analyzed light. A wave plate of λ=530 nm is used. The negatives are produced on Kodacolor Gold 100 ASA films.

The preparations for electron microscopy were made up in a glove box under nitrogen with a greatly reduced humidity level. The polyborazylene in borazine is simply deposited on copper grids coated with a perforated carbon film. The preparations are then rapidly placed under a low vacuum in the prepumping chamber before being introduced into the microscope under an ionic vacuum (fresh preparations). Some of these preparations, stored in air without special precautions, were observed again several days later. The preparations have solidified, contain bubbles and are stable under the beam.

The observations are made using a Philips CM30 ST apparatus aligned to 300 keV in the low dose mode. The energy losses (determined by the Electron Energy Loss Spectroscopy (EELS) technique) were measured using a Gatan 666-3K spectrometer and with the microscope aligned to 100 keV in the image mode so as to increase the energy resolution.

EXAMPLE 1

Synthesis of the Polyborazylene

The dehydrogenation/condensation reaction is carried out in a stainless steel autoclave of volume V=12 ml. The borazine charge (8.5 ml; 7.4 g; 0.092 mol) placed in said autoclave under an inert atmosphere ($P_{N_2}o=10^5$ Pa) corresponds to about threequarters of its volume. Said autoclave is then placed in an enclosure where the temperature is maintained at θ=70° C. for 48 h. Under these conditions, the borazine polycondenses to generate a low molecular polymer. The pressure inside the autoclave, due mainly to the release of dihydrogen, is measured after return to room temperature. This pressure is $360.10^5$ Pa. The weight of polyborazylene recovered is 6 g (yield=80%).

Analysis of said polyborazylene by $^{11}$B NMR in the decoupled mode reveals a broad peak centered at δ=+30 ppm, comprising shoulders characteristic of borazine rings. Said analysis is performed using a Brüicker DPX 400 spectrometer operating at 128 MHz, with tubes of 10 mm diameter.

Preparation of the Mesophase

The mesophase is obtained by mixing an amount m=110 mg of polyborazylene prepared in this way with an amount m=130 mg of borazine. The solution obtained is fluid and homogeneous. It has a milky appearance and possesses all the characteristics of a liquid crystal in light microscopy.

Characterization of said Mesophase
By Light Microscopy

Figure 1:
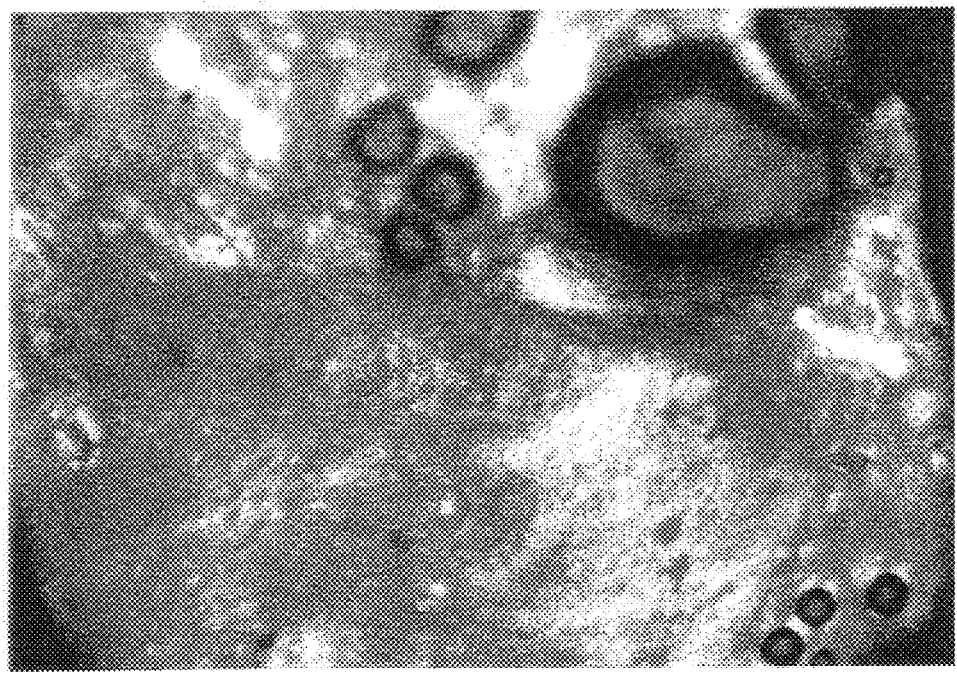
FIG. 1 shows a light microscope negative between crossed nicols of a mesophase of the invention obtained in the presence of a borazine solvent (wave plate) according to the protocol of Example 1.
Figure 2:
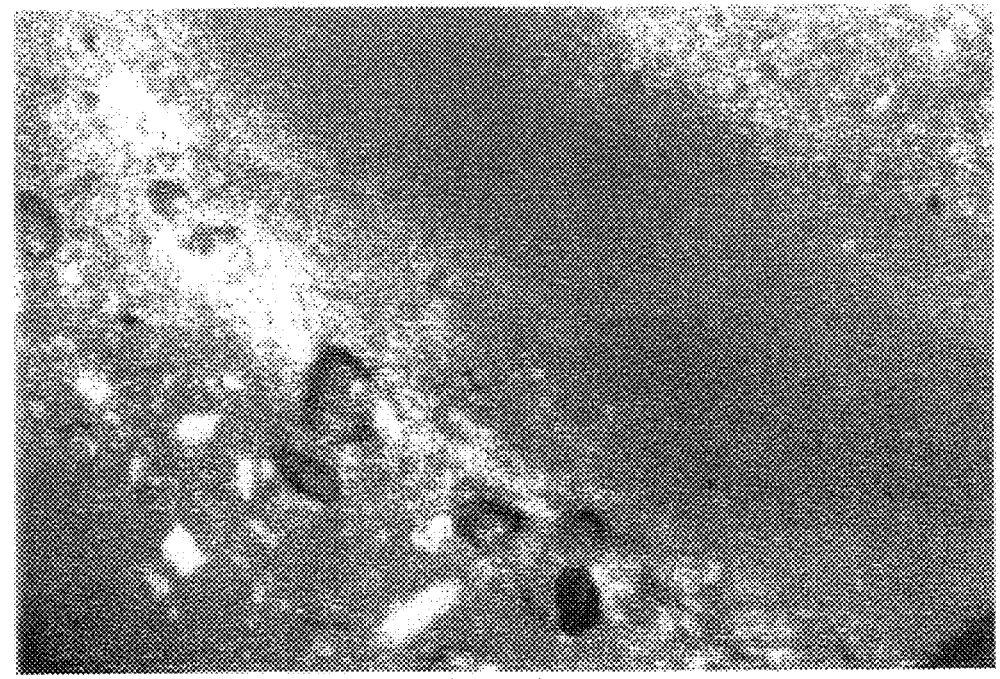
FIG. 2 shows a light microscope negative between crossed nicols of a polyborazylene aged according to the prior art (wave plate), more precisely according to the protocol of Comparative Example 1'.
Figure 3:
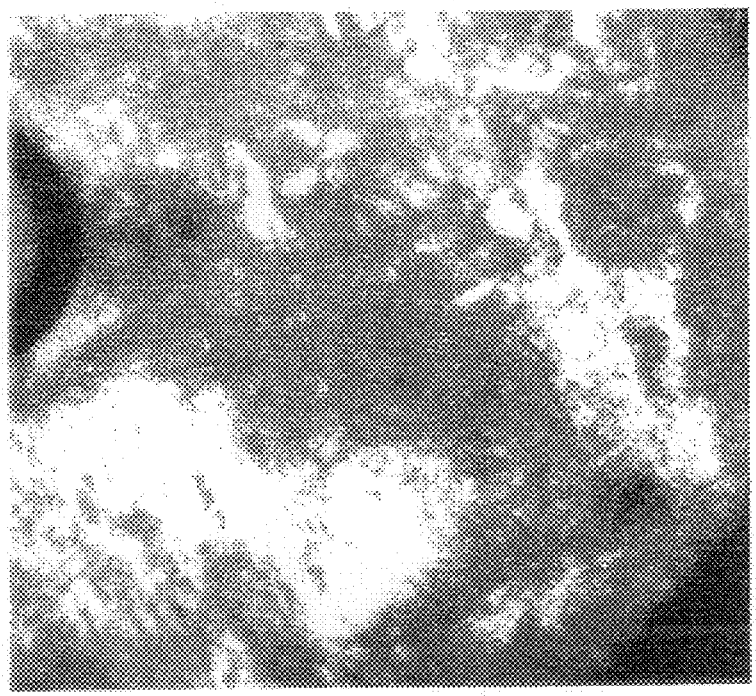
FIG. 3 shows a light microscope negative between crossed nicols of a mesophase of the invention obtained in the presence of a borazine solvent (wave plate) according to the protocol of Example 2.
Figure 4:
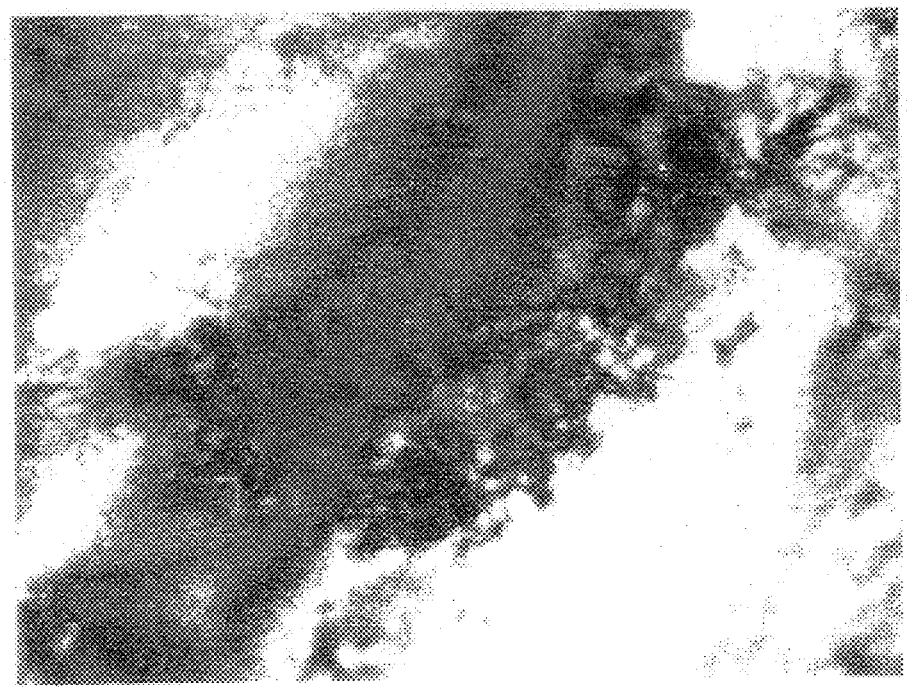
FIG. 4 shows a light microscope negative between crossed nicols of a mesophase of the invention obtained in the presence of an aromatic solvent (wave plate) according to the protocol of Example 3.

Observation by polarized light microscopy of the mesophase obtained with borazine shows the existence of broad yellow or blue isoclinic domains orientated at 45° to the polarizer or the analyzer (FIG. 1).

If polarized light passes through a birefringent crystalline medium, the rays then propagate in two orthogonal directions with different velocities according to the indices of this medium (birefringence). In the analyzer, these two beams recombine to create an interference color characteristic of the phase shift between the two beams. In the present case, if the drop of polyborazylene diluted in the solvent were isotropic, it would behave like all liquids (or isotropic media). There would be complete extinction between polarizer and analyzer. The liquid would appear black. On the other hand, if the molecules in this liquid possess long range or liquid crystal orientation ordering, as is the case, the light behaves as in a crystal and the liquid assumes characteristic interference colors. When the birefringence is weak, a wave plate which imposes a known phase shift equal to one times the wavelength is used in the optical path. The addition or subtraction of the phase shifts causes the orangeyellow and blue colors to appear in the negatives, proving the existence of the mesophase.

The negative of FIG. 1 shows that the addition of borazine does indeed result in the formation of liquid crystals. Furthermore, when the stage is rotated, a characteristic rolling extinction (curvature of the extinction contours) is observed, together with the existence of fixed singularities which provide evidence of the presence of disclinacions (rotation defects typical of liquid crystals). The addition of a small amount of solvent therefore allows the polymer to reorganize instantaneously, so the molecules containing planar borazine rings stack up and align themselves with long range ordering visible in the light microscope.

By Transmission Electron Microscopy

The mesophase is simply deposited on copper grids coated with a perforated carbon film. The preparations are then rapidly placed under a low vacuum in the prepumping chamber before being introduced into the microscope under an ionic vacuum.

Figure 5:
FIG. 5 shows bright field images of a freshly prepared mesophase of the invention (according to Example 1) including, as an insert, the electron diffraction spectrum (high resolution transmission electron microscopy)

The diffraction pattern obtained by transmission electron microscopy shows the existence of two-dimensional ordering associated with the sheets of hexagonal BN, with the appearance of broadened bands (10) and (11) and diffraction of the [100] and [110] rows of atoms (FIG. 5). When prepared, the molecules adopt an orientation parallel to the substrate (carbon film), making it impossible to reveal the diffraction lines of the (001) planes. However, the broadening of the hk diffraction bands enables the size of these diffracting domains to be calculated (extension of sheets). Thus it was possible to measure $L_a$=1.2 nm, which could correspond to structures containing in the order of 15 to 20 condensed rings.

After several days, the preparation changed form (formation of bubbles).

The solidification of the liquid crystal enables observations to be made which were inaccessible with the fresh preparation (unstable under the beam).

Figure 6:
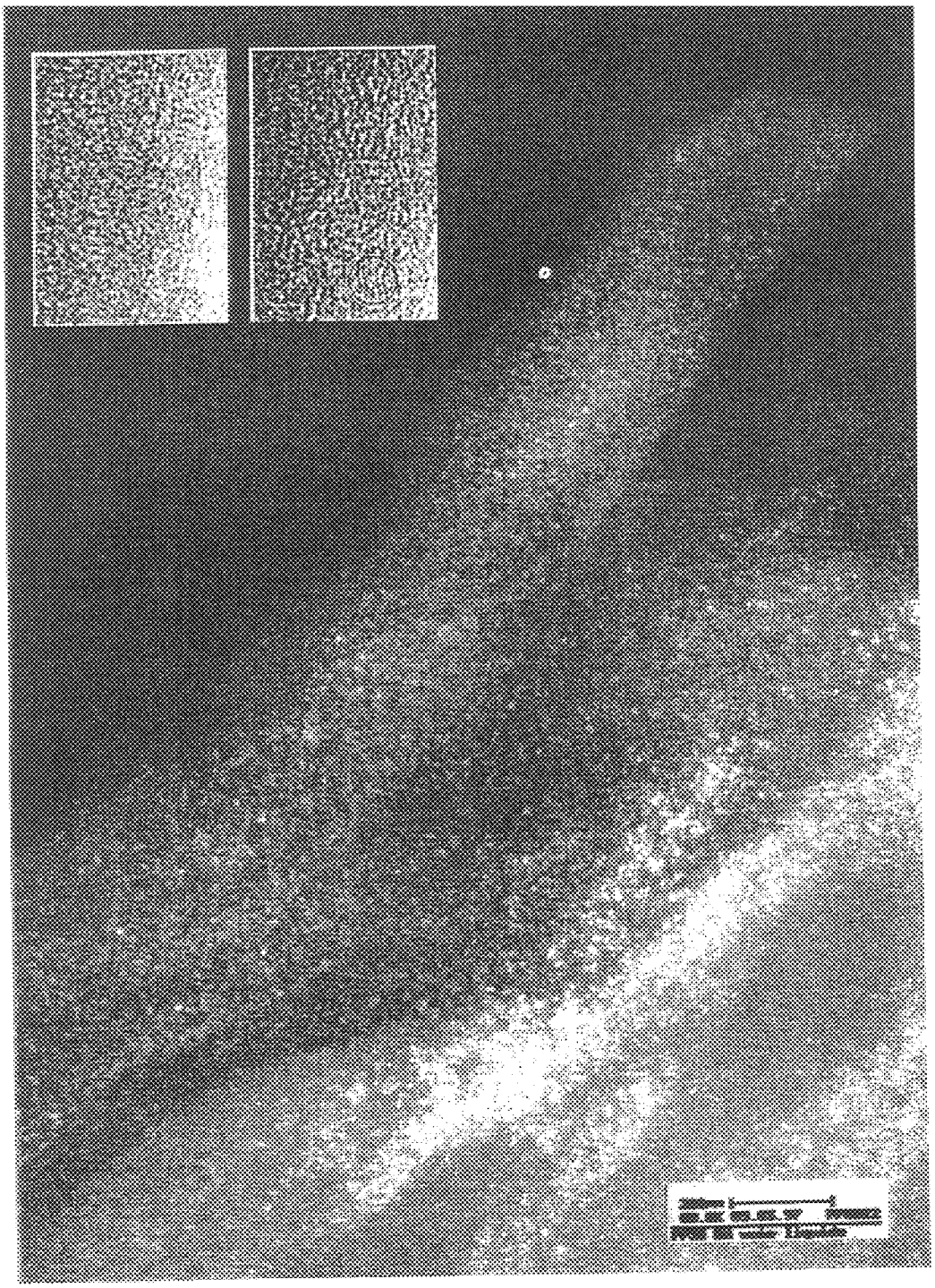
FIG. 6 shows a dark field image and lattice fringe images (insert) of a mesophase of the invention (prepared according to Example 1) from which the solvent has been at least partially removed and which has been stored in air (high resolution transmission electron microscopy)

The dark field observations (FIG. 6) on the walls of the bubbles make it possible to contrast numerous small basic structural units (BSU) belonging to one and the same isoclinic domain. Lattice fringe imaging allows these coherent domains to be visualized. They consist of stacks of large molecules, as shown in the insert of FIG. 6.

By Energy Loss (EELS)

The same preparations as above were characterized by energy loss of the electrons in the electron microscope. This technique makes it possible to reveal (and quantify) the elements present. Furthermore, the fine structures at the thresholds of the absorption peaks (ELNES: Electron Loss Near Edge Structure) make it possible to differentiate between the bonds (e.g. cubic BN or hexagonal BN).

Figure 7:
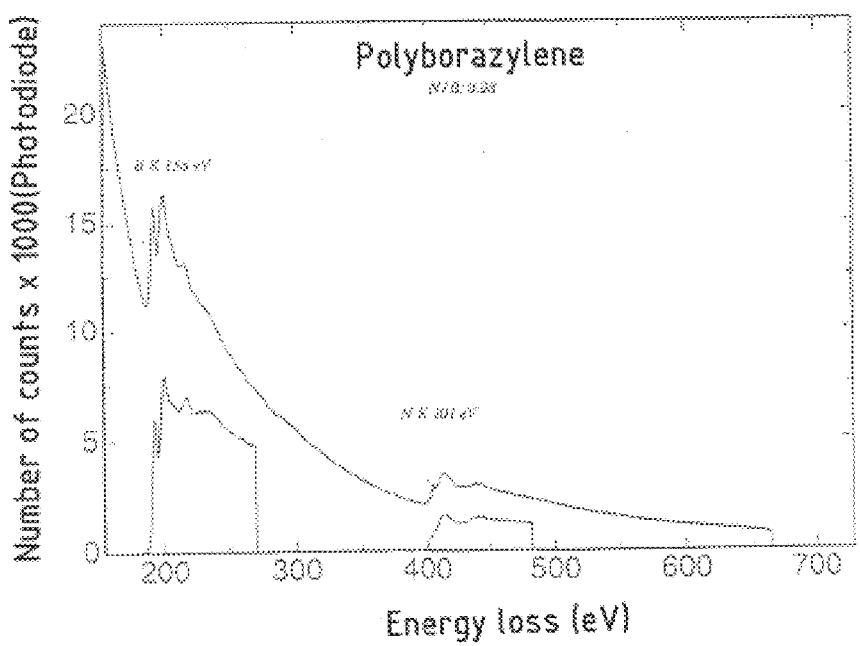
FIG. 7 shows an energy loss spectrum of a freshly prepared mesophase of the invention (according to Example 1) from which the solvent has been at least partially removed.

FIG. 7 shows the spectrum obtained for the mesophase from which part of the solvent has been removed (ionic vacuum of the microscope): the K thresholds of boron and nitrogen are visible at 188 eV and 401 eV respectively. The fine structures present at the thresholds are characteristic of hexagonal BN. This was demonstrated by comparing said spectrum on the one hand with that of a commercial cubic BN (supplied by DE BEERS) and on the other hand with that of a commercial BN-hex (supplied by PROLABO). These fine structures are due to the different possible transitions of the electrons. They are characteristic of the chemical environment of the atoms. Using this analysis, it is thus possible to quantify the relative concentrations of the elements. Thus, in the case of a freshly prepared product, the NIB ratio is approximately 1. When the polymer has been partially hydrolyzed, the structures of the B and N lines broaden. Also, the appearance of a broad peak is noted at E=532 eV, due to the presence of oxygen.

Figure 8:
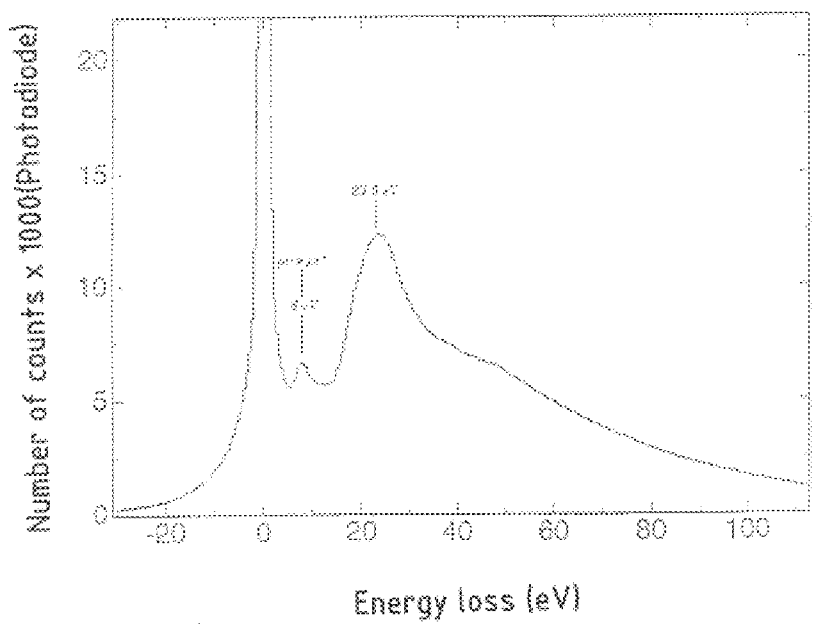
FIG. 8 shows a low energy loss spectrum of a freshly prepared mesophase of the invention (according to Example 1)

At low energies, the plasmon peak is observed; this corresponds to the collective excitation of the valence electrons (FIG. 8). Between the loss-free peak and the plasmon peak, a second peak is observed; this corresponds to the interband excitations at E=8 eV. These transitions, identified as $\pi \rightarrow \pi^*$, are characteristic of the aromaticity of the product.

EXAMPLE 1' (comparative)

Synthesis of the Polyborazylene

Said synthesis is carried out under the conditions specified in Example 1.

Ageing of said Polyborazylene

The polymer obtained is stored at around $\theta=0°$ C. for about 8 months.

After this low temperature storage, an attempt was made to characterize the "mesophase" obtained.

Characterization of the Mesophase by Light Microscopy

Even after solubilization, the mesophase obtained from borazylene according to the prior art does not lead to the same type of mesophase as those of the invention. This is clearly revealed on the negative of FIG. 2, where small anisotropic crystallites are observed. The slow condensation reactions have allowed the anisotropic domains to grow and said small insoluble crystallites to form. Furthermore, the most highly condensed polymers tend to form monocrystals, which are insoluble even at high dilution factors.

EXAMPLE 2

Synthesis of the Polyborazylene

The dehydrogenation/condensation reaction is carried out under the same conditions as those of Example 1 except that the initial dinitrogen pressure is $60.10^5$ Pa ( $P_{N_2O}=60.10^5$ Pa).

Preparation of the Mesophase

An amount m=110 mg of polyborazylene is mixed with an amount m=100 mg of borazine. The milky solution obtained is very fluid.

Characterization of said Mesoihase by Light Microscopy

As within the framework of Example 1 (and FIG. 1), light microscopy (cf. FIG. 3) shows interference colors, proving the formation of a liquid crystal. In this case, it is noted that the mesophase obtained possesses larger anisotropic domains, although the contours remain irregular.

EXAMPLE 3

Synthesis of the Polyborazylene

The polyborazylene is prepared under the conditions of Example 2.

Preparation of the Mesophase

An amount m=100 mg of polyborazylene is mixed with an amount m=90 mg of toluene. Said toluene has first been dried over sodium or by azeotropic distillation and then distilled over sodium. The milky solution obtained is very fluid.

Characterization of said Mesophase

The mesophase obtained (milky solution) has a degree of anisotropy greater than 80% in the polarized light microscope. Light microscopy (FIG. 4) in this case shows broad anisotropic domains with more regular contours.

EXAMPLE 4

The polyborazylene and the mesophase are obtained successively under the conditions of Example 2. Said mesophase is used to coat a carbon bundle by the dipcoating technique to form a coating which can act as an interphase in a composite, for example with a carbon reinforcement and ceramic matrix.

After coating, the deposit is treated at a temperature of about 60° C. for 24 hours in order to render it infusible. This treatment is followed by pyrolysis at 1000° C. in an inert atmosphere (argon) for 12 hours.

Figure 9:
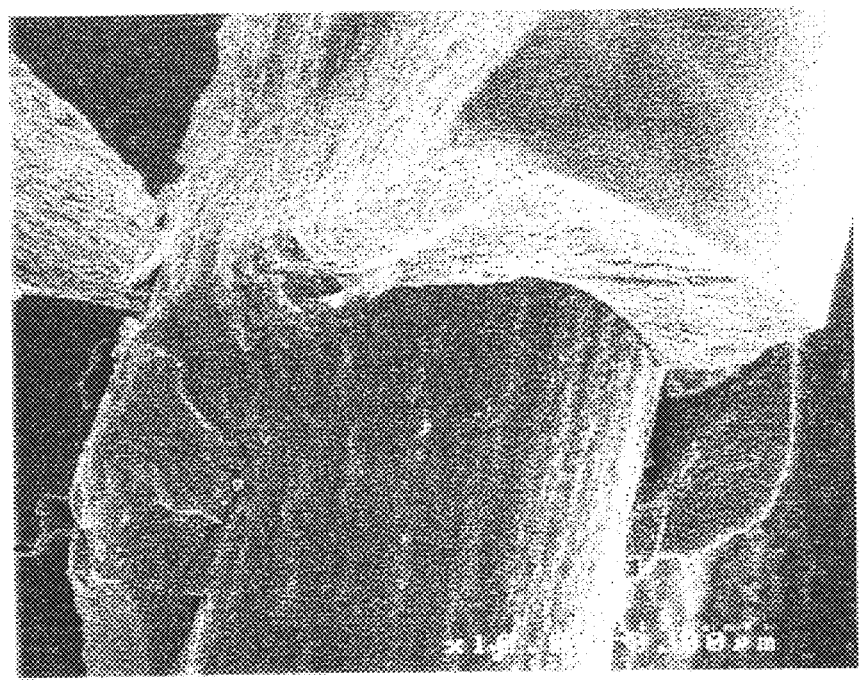
FIG. 9 shows a scanning electron microscope negative of a carbon bundle coated with a film obtained from a mesophase of the invention (mesophase prepared according to Example 2)

The mesophase exhibits perfect film-forming behavior. The film obtained is in fact homogeneous over its thickness and over the whole length of the coated bundle. This is clearly apparent when considering the scanning electron microscope negative (of one of the filaments of the bundle) in FIG. 9.

EXAMPLE 5

The polyborazylene and the mesophase are obtained successively under the conditions of Example 2. The mesophase is used to coat a bundle of silicon carbide fibers by the dipcoating technique to form a coating capable of acting as an interphase in a composite.

The deposit is then treated at a temperature of about 60° C. for 24 hours in order to render it infusible. This treatment is followed by pyrolysis at 1000° C. in an inert atmosphere (argon) for 12 hours. Silicon carbide is then deposited by chemical vapor phase deposition from a gaseous precursor consisting of a mixture of methyltrichlorosilane (MTS) and hydrogen (H$_2$) in a molar ratio of $$\alpha = \frac{H_2}{MTS} = 6,$$

at a temperature of 950° C. and under a pressure of 3 kPa, to give a unidirectional minicomposite with a fiber volume fraction of 40%. The material is tensiletested and characterized in structural and microstructural terms.

The material, comprising an interphase derived from the mesophasic polyborazylene precursor of the invention, has nonfragile behavior and, in particular, a rupture pattern characterized by substantial fiber pullout. This behavior is made possible by the presence of the interphase, which acts as a deflector of cracks in the matrix. Said interphase, consisting of the material derived from the mesophasic polyborazylene, forms the basis of the good mechanical behavior of the composite.

EXAMPLE 6

The polyborazylene and the mesophase are obtained successively under the conditions of Example 2. The mesophase is used as a precursor to boron nitride fibers. In this case, the amount of solvent used to obtain the mesomorphic state is adjusted to give the appropriate viscosity. When the mesophase reaches the desired viscosity, dry spinning is carried out at a temperature in the order of 70° C.

Analysis of the crude fibers by the EELS (energy loss) technique shows that their composition is very similar to stoichiometry: B/N (atomic)=1.

Figure 10:
FIG. 10 shows a lattice fringe image (high resolution transmission electron microscope negative) of the texture of a boron nitride fiber obtained from a mesophase of the invention (mesophase prepared according to Example 2).

The fibers are then heatstabilized. Finally, they are pyrolyzed successively at 1000° C. for 12 hours and then at 1250° C. for 2 hours under argon. The transmission electron microscope negative shows the extent to which the addition of solvent does indeed make it possible to adjust the viscosity, since fiber diameters of less than 3 μm were easily obtained. The structure and chemical composition of the fibers confirm the formation of a virtually stoichiometric boron nitride. At 1250° C. this boron nitride already exhibits an advanced state of "graphitization". Quantitative analysis of the electron diffraction negatives shows the development of three-dimensional ordering. The boron nitride crystallites consist of about ten layers spaced apart by an average distance in the order of 0.336 nm (FIG. 10).

What is claimed is:

1. A process for the preparation of a mesophase of polyborazylene, comprising the steps of:
    a. preparing polyborazylene by the polycondensation of borazine in a closed reactor, and
    b. adding a solvent to said polyborazylene obtained by said polycondensation, resulting in the generation of said mesophase, wherein said solvent is selected from the group consisting of aromatic solvents, borazine solvents and mixtures thereof.

2. The process according to claim 1, characterized in that said mesophase is subsequently treated so as to remove all or part of said solvent therefrom.

3. The process according to claim 1, characterized in that said polycondensation is carried out at a temperature of between 50 and 120° C.

4. The process according to claim 1, characterized in that said polycondensation is carried out under an initial inert gas pressure of between atmospheric pressure and $200.10^5$ Pa.

5. The process according to claim 1, characterized in that said solvent is selected from borazine, benzene, toluene and xylenes.

6. The process according to claim 1, characterized in that said solvent is added in a solvent/polyborazylene weight ratio below 10.

7. The process according to claim 6, characterized in that said solvent is added in a solvent/polyborazylene weight ratio greater than 1.

8. The process according to claim 6, characterized in that said solvent is added in a solvent/polyborazylene weight ratio less than or equal to 1.

9. The process according to claim 3, characterized in that said polycondensation is carried out at a temperature of between 60 and 80° C.

10. The process according to claim 6, characterized in that said solvent is added in a solvent/polyborazylene ratio between 0.2 and 5.

11. Mesophase of polyborazylene in the presence of a solvent selected from aromatic solvents, borazine solvents and mixtures thereof.

12. Mesophase of polyborazylene having a degree of anisotropy greater than 50% in light microscopy.

13. The mesophase of polyborazylene of claim 12, wherein said degree of anisotropy is approximately 100% in light microscopy.

14. The mesophase of polyborazylene of claim 12 wherein said degree of anistropy is greater than 80% in light microscopy.

15. A process for preparing boron nitride from a precursor of boron nitride, comprising thermally treating said precursor, wherein said precursor is a mesophase of polyborazylene in the presence of solvent according to claim 11.

16. The process according to claim 15 for preparing hexagonal boron nitride.

17. A process for preparing boron nitride from a precursor of boron nitride, comprising thermally treating said precursor, wherein said precursor is a mesophase of polyborazylene according to claim 12.

18. The process according to claim 17 for preparing hexagonal boron nitride.

19. A process for preparing boron nitride from a precursor of boron nitride, comprising thermally treating said precursor, wherein said precursor is a mesophase of polyborazylene prepared according to claim 1.

20. The process according to claim 19 for preparing hexagonal boron nitride.

* * * * *

UNITED STATES PATENT AND TRADEMARK OFFICE
CERTIFICATE OF CORRECTION

PATENT NO. : 6,277,348 B1
DATED : August 21, 2001
INVENTOR(S) : Patrick Pujol et al.

It is certified that error appears in the above-identified patent and that said Letters Patent is hereby corrected as shown below:

Column 1,
Line 7, "W099/01389" should read -- WO99/01378 --;
Line 21, "midseventies," should read -- mid-seventies, --;
Line 25, "siliconcontaining" should read -- silicon-containing --;
Line 29, "hightemperature" should read -- high-temperature --;
Line 65, "Highyield" should read -- High-yield --;

Column 2,
Line 4, "Highyield" should read -- High-yield --;

Column 3,
Lines 33-34, "nonre-producibly" should read -- non-reproducibly --;

Column 4,
Line 1, "200.10$_5$" should read -- 200.10$^5$ --;
Line 38, "Nalkyl" should read -- N-alkyl --;
Line 39, "Balkylborazines" should read -- B-alkyl-borazines --;

Column 5,
Line 62, "nonhexagonal" should read -- non-hexagonal --;

Column 7,
Line 34, "threequarters" should read -- three-quarters --;
Line 45, "Brüicker" should read -- Brücker --;

Column 8,
Line 11, "orangeyellow" should read -- orange-yellow --;

Column 9,
Line 10, "NIB" should read -- N/B --;
Line 63, "Mesoihase" should read -- Mesophase --;

Column 10,
Line 27, "dipcoating" should read -- dip-coating --;
Line 47, "dipcoating" should read -- dip-coating --;
Line 61, "tensiletested" should read -- tensile-tested --;
Line 66, "pullout." should read -- pull-out. --; and

UNITED STATES PATENT AND TRADEMARK OFFICE
CERTIFICATE OF CORRECTION

PATENT NO.    : 6,277,348 B1
DATED         : August 21, 2001
INVENTOR(S)   : Patrick Pujol et al.

It is certified that error appears in the above-identified patent and that said Letters Patent is hereby corrected as shown below:

Column 11,
Line 18, "heatstabilized." should read -- heat-stabilized. --.

Signed and Sealed this

Thirteenth Day of May, 2003

JAMES E. ROGAN
*Director of the United States Patent and Trademark Office*